United States Patent
Chen et al.

(10) Patent No.: US 7,471,287 B2
(45) Date of Patent: Dec. 30, 2008

(54) LIGHT SOURCE DRIVING CIRCUIT FOR DRIVING LIGHT EMITTING DIODE COMPONENTS AND DRIVING METHOD THEREOF

(75) Inventors: Bi-Hsien Chen, Pingtung County (TW); Han-Yu Chao, Tainan County (TW); Shin-Chang Lin, Taipei County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 64 days.

(21) Appl. No.: 11/618,048

(22) Filed: Dec. 29, 2006

(65) Prior Publication Data

US 2008/0100234 A1     May 1, 2008

(30) Foreign Application Priority Data

Nov. 1, 2006    (TW) ............................... 95140407 A

(51) Int. Cl.
*G09G 5/00* (2006.01)
*G05F 1/00* (2006.01)

(52) U.S. Cl. ................. 345/212; 345/102; 345/211; 345/204; 345/82; 315/291; 315/308; 315/312; 315/360

(58) Field of Classification Search ........ 315/291, 315/307, 308–311, 224, 225, 297, 247, 246, 315/185 S, 200 A, 360, DIG. 4, 312–326; 345/212, 211, 213, 214, 204, 102, 82
See application file for complete search history.

(56) References Cited

U.S. PATENT DOCUMENTS

| | | | |
|---|---|---|---|
| 6,400,101 B1 | 6/2002 | Biebl et al. | |
| 6,556,067 B2 | 4/2003 | Henry | |
| 6,636,104 B2 | 10/2003 | Henry | |
| 6,742,156 B2 | 5/2004 | Shieh | |
| 6,864,641 B2 * | 3/2005 | Dygert | 315/216 |
| 6,949,892 B2 | 9/2005 | Horiuchi et al. | |
| 7,348,958 B2 * | 3/2008 | Park | 345/102 |
| 2003/0169097 A1 | 9/2003 | Henry | |
| 2005/0152123 A1 | 7/2005 | Voreis et al. | |
| 2006/0108933 A1 | 5/2006 | Chen | 315/86 |
| 2008/0088252 A1 * | 4/2008 | Chen et al. | 315/224 |
| 2008/0136350 A1 * | 6/2008 | Tripathi et al. | 315/294 |

FOREIGN PATENT DOCUMENTS

TW      1236165      7/2004

* cited by examiner

*Primary Examiner*—Tuyet Vo
(74) *Attorney, Agent, or Firm*—J.C. Patents

(57) ABSTRACT

A light source driving circuit is adapted for driving a light-emitted component. The light source driving circuit includes a power supply, a dimming circuit, and a feedback circuit. An output terminal of the power supply is coupled to one terminal of the light-emitted component to supply a power to the light-emitted component, and determine the power value according to a feedback signal received by a feedback terminal of the power supply. A first terminal of the dimming circuit is coupled to another terminal of the light-emitted component. A second terminal of the dimming circuit is coupled to a common voltage. According to a logic state of a pulse width signal, the dimming circuit determines the conduction of the first terminal and the second terminal. The feedback circuit is coupled between the first terminal and the feedback terminal, and determines the feedback signal according to on/off state of the dimming circuit.

24 Claims, 3 Drawing Sheets

US 7,471,287 B2

LIGHT SOURCE DRIVING CIRCUIT FOR DRIVING LIGHT EMITTING DIODE COMPONENTS AND DRIVING METHOD THEREOF

CROSS-REFERENCE TO RELATED APPLICATION

This application claims the priority benefit of Taiwan application serial no. 95140407, filed Nov. 1, 2006. All disclosure of the Taiwan application is incorporated herein by reference.

BACKGROUND OF THE INVENTION

1. Field of the Invention

The present invention relates to a driving circuit, and more particularly, to a light source driving circuit for driving light emitting components.

2. Description of Related Art

Light source driving circuits have a wide application, which are used as the backlight driving circuits of liquid crystal displays or light emitting diode (LED) driving circuits of handheld mobile devices. In addition, light source driving circuits have a high potential for development. The light source driving circuit has many advantages that can be continuously improved or enhanced, such as enhancing power energy conversion efficiency and improving stability.

FIG. 1 shows the architecture of a conventional light source driving circuit for driving a (string of) light emitting diode (LED) 106. The circuit comprises a DC-DC power supply voltage converter 101, an output voltage feedback circuit 102, an output capacitor 103, a timing control circuit 104, and a dimming circuit 105. The dimming circuit 105 is coupled between the cathode of the LED string 106 and the common level GND and receives the pulse width signal PWM output by the timing control circuit 104. In addition, the output voltage feedback circuit 102 is implemented by connecting two resistors in series.

The power supply voltage converter 101 provides a DC power supply voltage to the LED string 106, and stabilizes the output voltage through the feedback signal fed back from the output voltage feedback circuit 102. The timing control circuit 104 determines the width of the output pulse width signal PWM according to the brightness set by a user. The dimming circuit 105 is turned on when the pulse width signal PWM is at a high level, and is turned off when the pulse width signal PWM is at a low level. Through adjusting the width of the pulse width signal PWM, the on/off state of the dimming circuit 105 is controlled, and further the LED string 106 is controlled to allow current passing through or not. As such, when the brightness is set higher, the time of the pulse width signal PWM being at the high level is longer, the time of the dimming circuit 105 being at the on-state is long, and the brightness of the LED string 106 is brighter. On the contrary, when the brightness is set lower, the time of the pulse width signal PWM being at the high level is shorter, the time of the dimming circuit 105 being at the on-state is shorter, and the brightness of the LED string 106 is dimmer.

However, when the pulse width signal PWM is at a low level, the dimming circuit 105 is not turned on, and at this time, all the voltage drop of the output voltage supplied by the power supply voltage converter 101 falls on the dimming circuit 105. When the LED string 106 has more LEDs connected in series, the output voltage supplied by the power supply voltage converter 101 becomes extremely high. When the withstand voltage of the dimming circuit 105 is insufficient, the dimming circuit 105 may be damaged by the output voltage supplied by the power supply voltage converter 101. Further, a dimming circuit 105 with higher withstand voltage must be employed, and the dimming circuit 105 with higher withstand voltage has a larger volume and is more expensive, which causes an increase in the volume and the cost of the integrated circuit, and thus reducing competitiveness of the product in the market.

SUMMARY OF THE INVENTION

An objective of the present invention is to provide a light source driving circuit for adaptively adjusting the output voltage, so as to avoid damaging the internal components of the light source driving circuit, thus prolonging the service life of the light source driving circuit.

Another objective of the present invention is to provide a light source driving circuit for reducing the cost of the internal components of the light source driving circuit, thus raising the competitiveness of the product.

The present invention provides a light source driving circuit, suitable for driving a first light emitting component. The light source driving circuit comprises a power supply circuit, a first dimming circuit, and a feedback circuit. The output terminal of the power supply circuit is coupled to one terminal of the first light emitting component and determines the value of the power supply voltage supplied to the output terminal according to a feedback signal received by the feedback terminal. The first terminal of the first dimming circuit is coupled to another terminal of the first light emitting component, and the second terminal of the first dimming circuit is coupled to a common level. The first dimming circuit determines the on/off state of the first terminal and the second terminal thereof according to the logic states of a pulse width signal. The feedback circuit is coupled between the first terminal of the first dimming circuit and the feedback terminal of the power supply circuit and determines the feedback signal according to the on/off state of the first dimming circuit.

According to the light source driving circuit in a preferred embodiment of the present invention, the above feedback circuit further comprises an output terminal coupled to a power supply voltage supplier and determines the feedback signal according to the value of the power supply voltage. The feedback circuit of an embodiment comprises an impedance detection circuit and a feedback voltage control circuit. The first terminal of the impedance detection circuit is coupled to the first terminal of the first dimming circuit, and the second terminal of the impedance detection circuit is coupled to the common level. The level output by the detection terminal of the impedance detection circuit is determined according to the impedance between the first terminal and the second terminal. The input terminal of the feedback voltage control circuit is coupled to the detection terminal of the impedance detection circuit and controls the voltage value of the feedback signal output by the output terminal according to the level output by the detection terminal of the impedance detection circuit.

According to the light source driving circuit in a preferred embodiment of the present invention, the above impedance detection circuit comprises a first impedance component and a second impedance component. One terminal of the first impedance component is the first terminal of the impedance detection circuit, and another terminal of the first impedance component is the detection terminal of the impedance detection circuit. One terminal of the second impedance component is coupled to another terminal of the first impedance component, and another terminal of the second impedance component is coupled to the common level.

According to the light source driving circuit in a preferred embodiment of the present invention, the above feedback voltage control circuit comprises an operational amplifier having a first input terminal, a second input terminal, and an output terminal, wherein the output terminal is coupled to the feedback terminal of the power supply voltage supplier, the first input terminal is coupled to the detection terminal of the impedance detection circuit, and the second input terminal is coupled to a reference voltage. In the embodiment, the feedback voltage control circuit further comprises a first diode and a second diode. The cathode of the first diode is coupled to the output terminal of the operational amplifier, and the anode of the first diode is coupled to the feedback terminal of the power supply voltage supplier. The cathode of the second diode is coupled to the anode of the first diode, and the anode of the second diode is coupled to the feedback terminal of the power supply voltage supplier.

According to the light source driving circuit in a preferred embodiment of the present invention, the above feedback voltage control circuit further comprises a third impedance component and an output voltage feedback circuit. One terminal of the third impedance component is coupled to the anode of the first diode, and another terminal of the third impedance component is coupled to the output terminal of the power supply voltage supplier. The output voltage feedback circuit is coupled between the output terminal of the power supply voltage supplier and the feedback terminal of the power supply voltage supplier for determining the value of the feedback voltage according to the output voltage of the power supply voltage supplier. In the embodiment, the output voltage feedback circuit comprises a fourth impedance component and a fifth impedance component. One terminal of the fourth impedance component is coupled to the output terminal of the power supply voltage supplier, and another terminal of the fourth impedance component is coupled to the feedback terminal of the power supply voltage supplier. One terminal of the fifth impedance component is coupled to another terminal of the fourth impedance component, and another terminal of the fifth impedance component is coupled to the common level.

According to the light source driving circuit in a preferred embodiment of the present invention, a timing control circuit coupled to the first dimming circuit is further comprised for converting the brightness setting input by the user to the pulse width signal. In the embodiment of the light source driving circuit, the first light emitting component is at least a light emitting diode and has the anode coupled to the output terminal of the power supply voltage supplier.

The present invention adopts the feedback circuit to determine the feedback signal according to the on/off state of the dimming circuit, thus adaptively adjusting the output voltage in the manner of changing the feedback signal, and further avoiding damaging the dimming circuit components in the light source driving circuit and prolonging the service life of the light source driving circuit. Moreover, since the output voltage is adaptively adjusted, the dimming circuit with high price and high withstand voltage is not required, thus reducing the cost of the internal components of the light source driving circuit and accordingly raising the competitiveness of the product.

In order to make the aforementioned and other objects, features and advantages of the present invention comprehensible, preferred embodiments accompanied with figures are described in detail below.

DESCRIPTION OF EMBODIMENTS

Figure 1:
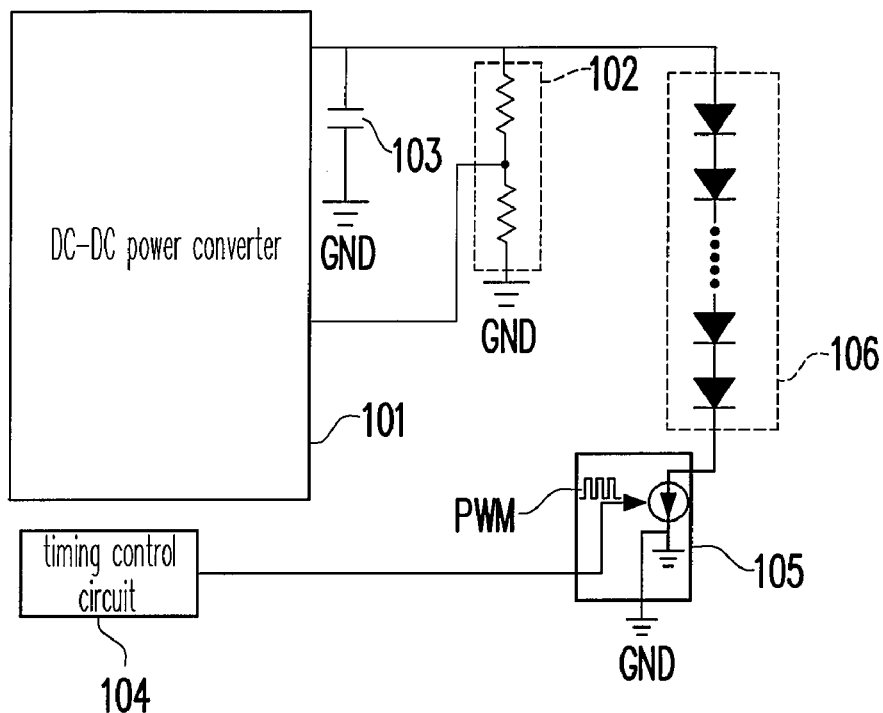
FIG. 1 is a circuit diagram of a conventional light source driving circuit for driving a string of light emitting diodes 106.
Figure 2:
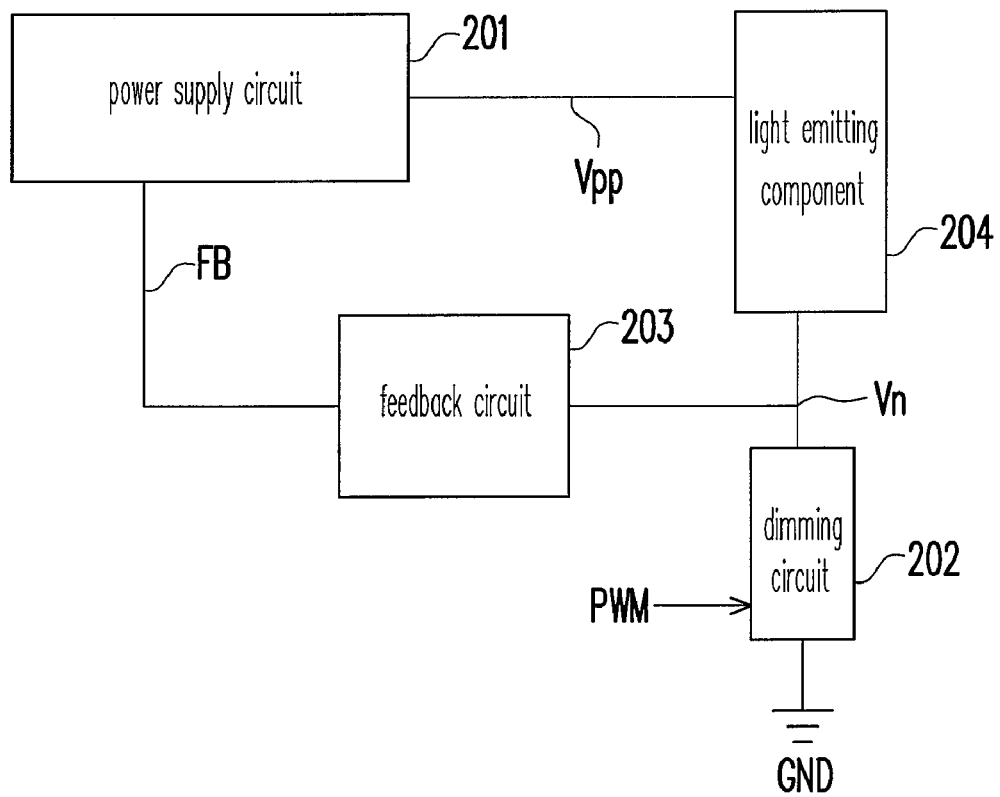
FIG. 2 is a circuit diagram of the light source driving circuit according to the first embodiment of the present invention.

FIG. 2 is a circuit diagram of the light source driving circuit according to the first embodiment of the present invention. The light source driving circuit is suitable for driving a light emitting component 204. Referring to FIG. 2, the light source driving circuit mainly comprises a power supply circuit 201, a dimming circuit 202, and a feedback circuit 203. It is known to those of ordinary skill in the art that the power supply circuit 201 in the above embodiment is not limited to a certain type of power supply circuit; the buck, boost, and buck-boost power supply circuits, including various topologies derived from the above power supply circuits such as forward, flyback, half-bridge, and full-bridge, and the linear voltage adjuster can be used to implement the embodiment of the present invention. In addition, there is a node voltage Vn marked in FIG. 2 for convenient description the embodiment.

The output terminal of the power supply circuit 201 is coupled to one terminal of the light emitting component for supplying a power supply voltage Vpp to the light emitting component 204 and determining the value of the supplied power supply voltage according to the feedback signal FB received by the feedback terminal. The dimming circuit 202 is coupled between another terminal of the light emitting component 204 and a common level GND and determines the on/off state between the light emitting component 204 and the common level GND according to the logic states of a pulse width signal PWM. When the brightness is set higher, the time of the pulse width signal PWM being at a logic high level is longer, the time of the dimming circuit 202 being at the on-state is longer, thus the light emitting component 204 is brighter.

The feedback circuit 203 is coupled between the dimming circuit 202 and the feedback terminal of the power supply circuit 201 and determines the feedback signal according to the on/off state of the dimming circuit 202. For example, when the dimming circuit 202 is turned off, the power supply circuit 201 is substantially in a no-load state, and thus the power supply voltage Vpp outputted by the power supply circuit 201 will be continuously rising. Therefore, the voltage Vn loaded on the dimming circuit 202 will be simultaneously rising. When detecting that the dimming circuit 202 is turned off, the feedback circuit 203 controls the feedback signal FB received by the feedback terminal of the power supply circuit 201, and further controls the power supply voltage Vpp to decrease. Therefore, the voltage Vn loaded on the dimming circuit 202 will be simultaneously decreasing into a safety range. The service life of the light source driving circuit is thus prolonged.

It should be noted that the above embodiment has described a possible form of the light source driving circuit of the embodiment of the present invention. However, it is known to those skilled in the art that various manufacturers have different designs of the feedback circuit and dimming circuit, thus the application of the present invention is not limited to this possible form. In other words, as long as the feedback circuit 203 is coupled between the dimming circuit 202 and the power supply circuit 201 and controls the feedback signal FB according to the on/off state of the dimming circuit 202, it falls in the spirit of the present invention.

Figure 3:
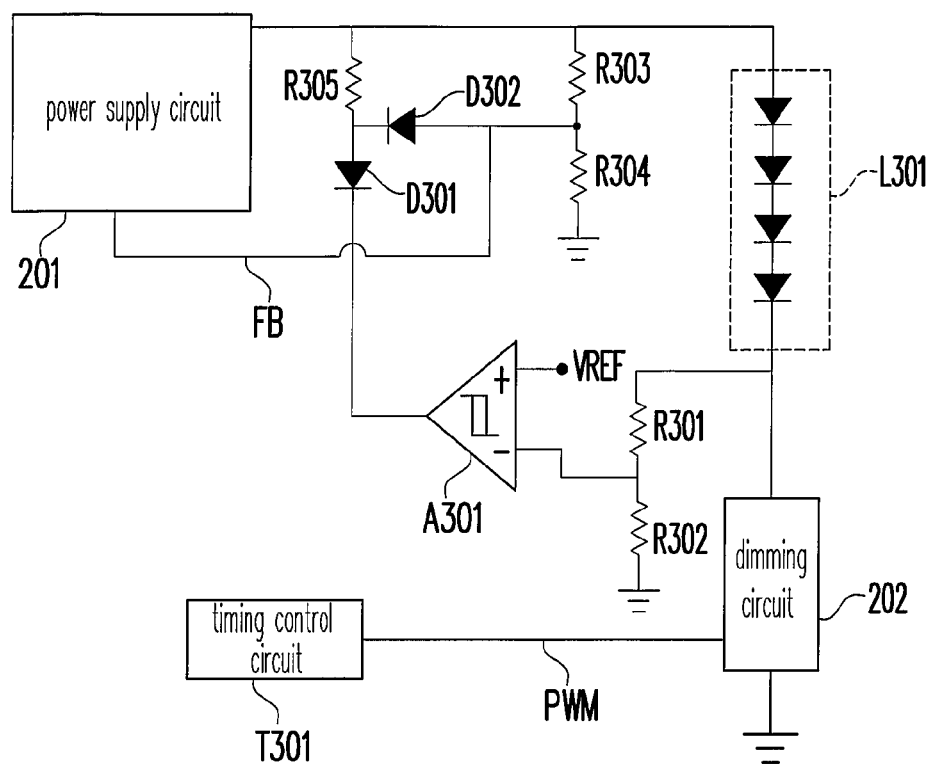
FIG. 3 is a circuit diagram of the light source driving circuit according to the second embodiment of the present invention.

FIG. 3 is a circuit diagram of the light source driving circuit according to the second embodiment of the present invention. Referring to FIG. 3, in the embodiment, the light emitting component 204 (appeared in the FIG. 2) is implemented by a string of light emitting diodes L301 which are connected through coupling the anode to the cathode, and the anode of the first light emitting diode is coupled to the output terminal of the power supply circuit 201. The feedback circuit 203 (appeared in the FIG. 2) is implemented by resistors R301~R305, diodes D301~D302, and an operational amplifier A301. Moreover, in the embodiment, a timing control circuit T301 is added for determining and outputting an output pulse width signal PWM according to the brightness setting input by the user.

The present embodiment is illustrated in two parts by using the logic levels of the pulse width signal PWM output by the timing control circuit T301.

First, when the output of the timing control circuit T301 is at a logic high level, the dimming circuit 202 is turned on, and thus the voltage drop between the dimming circuit 202 and the common level GND is low. The resistors R301 and R302 are used to detect the impedance of the dimming circuit 202 through voltage division. For example, when the dimming circuit 202 is not turned on, i.e. the dimming circuit 202 is at a high impedance state, the divided voltage obtained at the terminal of the resistor R301 coupled to the resistor R302 is a high level. And when the dimming circuit 202 is turned on, i.e. the dimming circuit 202 is at a low impedance state, the divided voltage obtained at the terminal of the resistor R301 coupled to the resistor R302 is a low level.

The negative input terminal of the operational amplifier A301 is coupled to the resistors R301 and R302, and the positive input terminal of the operational amplifier A301 is coupled to a reference voltage VREF. In the present embodiment, the operational amplifier A301 is generally designed to have a large gain, and the reference voltage VREF is a fixed voltage. When the dimming circuit 202 is turned on, the voltage received by the negative input terminal of the operational amplifier A301 is lower than the reference voltage VREF. Since the gain of the operational amplifier A301 is large enough, the level output by the output terminal of the operational amplifier A301 is a positive saturation level (high level). Since the level output by the output terminal of the operational amplifier A301 is a positive saturation level (high level), the diodes D301 and D302 are not turned on. The value of the feedback signal FB is determined by the output voltage feedback circuit formed by the resistors R303 and R304. The power supply voltage Vpp output by the power supply circuit 201 is stabilized through the feedback signal FB.

When the output of the timing control circuit T301 is at a logic low level, the dimming circuit 202 is not turned, and thus the voltage drop between the dimming circuit 202 and the common level GND is high, and the divided voltage obtained at the terminal of the resistor R301 coupled to the resistor R302 is a high level. The voltage received by the negative input terminal of the operational amplifier A301 is larger than the reference voltage VREF. Since the gain of the operational amplifier A301 is large enough, the level output by the output terminal of the operational amplifier A301 is a negative saturation level (low level). Since the level output by the output terminal of the operational amplifier A301 is a negative saturation level (low level), the diodes D301 and D302 are turned on. The feedback signal FB is pulled down by the diodes D301 and D302, and the power supply circuit 201 accordingly pulls down the output power supply voltage Vpp after receiving the pulled-down feedback signal FB.

It can be seen from the above embodiments that when the dimming circuit 202 is not turned on, the feedback circuit implemented according to the above embodiment controls the feedback signal FB, thus achieving the effect of reducing the output voltage and further avoiding damaging the dimming circuit 202, and thus prolonging the service life of the circuit. Moreover, when the dimming circuit 202 is not turned on, the power supply voltage Vpp is adjusted down, and thus a dimming circuit 202 with lower price and lower withstand voltage can be used to replace the original dimming circuit 202 having higher withstand voltage, which further reduces the cost of the internal components of the light source driving circuit and raises the competitiveness of the product.

Figure 4:
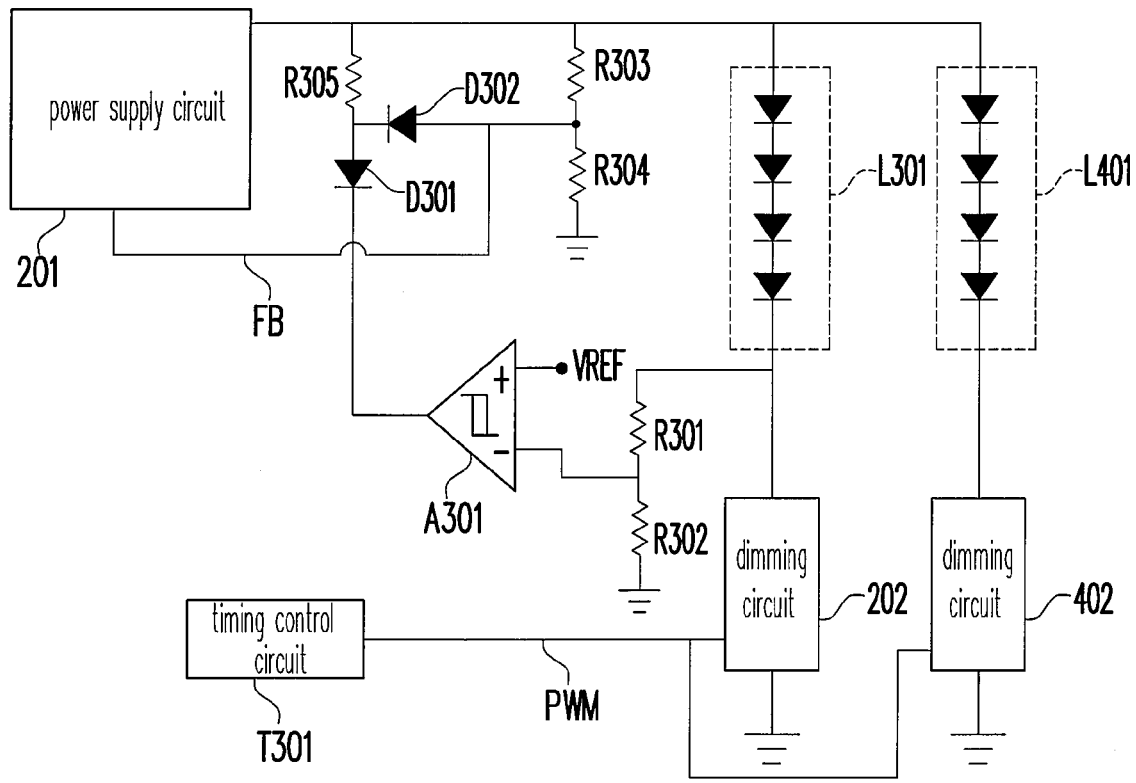
FIG. 4 is a circuit diagram of the light source driving circuit according to the third embodiment of the present invention.

FIG. 4 is a circuit diagram of the light source driving circuit according to the third embodiment of the present invention. Referring to FIG. 4 and FIG. 3 together, the difference between the circuit of FIG. 4 and the circuit of FIG. 3 is that an extra set of light emitting diodes L401 and a corresponding dimming circuit 402 are added in FIG. 4 compared with FIG. 3. This circuit can achieve the effect of reducing the output voltage when the dimming circuit 202 is not turned on just by adding a feedback circuit between the original light emitting diode L301 and the dimming circuit 202. The circuit principle thereof is the same as that of FIG. 3, so the details will not be described herein again. Furthermore, tow sets of light emitting diodes L401, L301 and two sets of dimming circuits 202, 402 are employed in the present embodiment. It is apparent to those of ordinary skill in the art that the present embodiment can also be implemented by plural sets of light emitting diodes and plural sets of dimming circuits.

Figure 5:
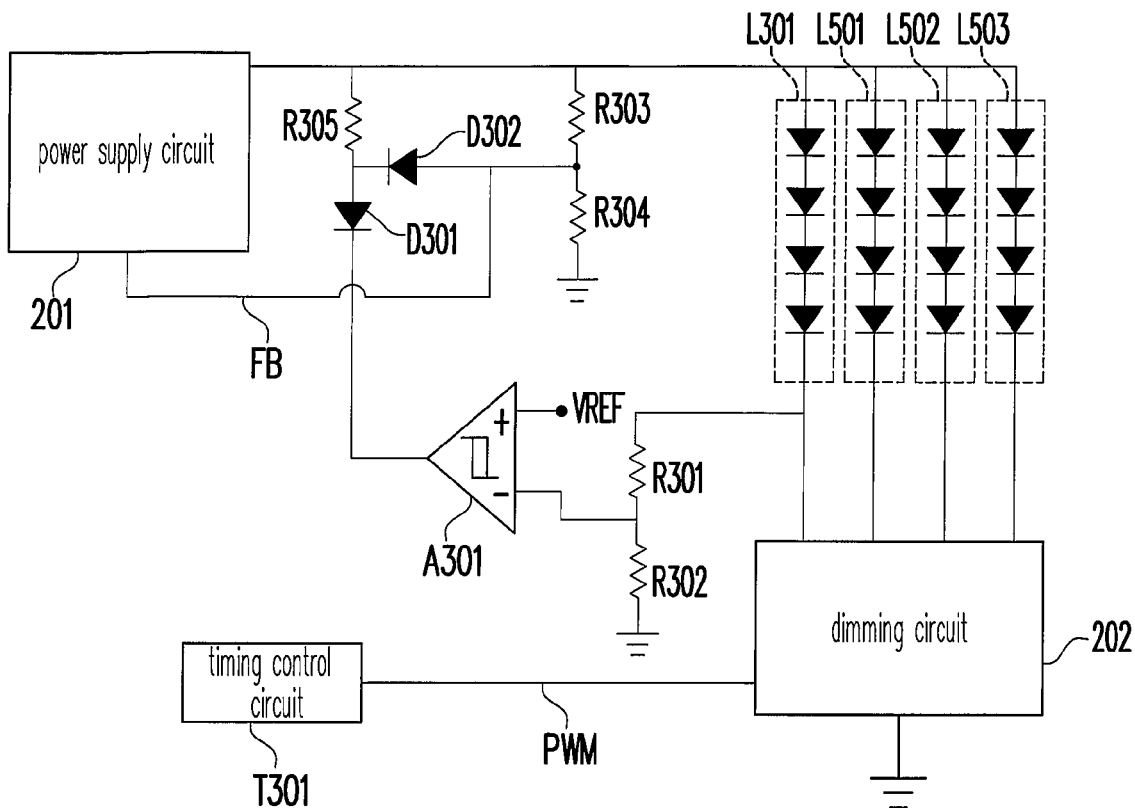
FIG. 5 is a circuit diagram of the light source driving circuit according to the fourth embodiment of the present invention.

FIG. 5 is a circuit diagram of the light source driving circuit according to the fourth embodiment of the present invention. Referring to FIG. 5 and FIG. 3 together, the difference between the circuit of FIG. 5 and the circuit of FIG. 3 is that three sets of light emitting diodes L501, L502, and L503 are added in FIG. 5 compared with FIG. 3, and additionally the dimming circuit also has three more current channels for determining the on/off state of the four sets of light emitting diodes L301, L501, L502, and L503 through the pulse width signal PWM. Similarly, the circuit of FIG. 5 can achieve the effect of reducing the output voltage when the dimming circuit 202 is not turned on just by adding a feedback circuit between the light emitting diode L301 and the dimming circuit 202 to control the feedback signal FB. The circuit principle is the same as that of FIG. 3, so the details will not be described herein. Moreover, in the present invention, four sets of light emitting diodes L301, L501~L503 and the dimming circuits 202 having four channels are employed. It is apparent to those of ordinary skill in the art that the present embodiment can also be implemented by more than two sets of light emitting diodes and the dimming circuit 202 having more than two channels.

Figure 6:
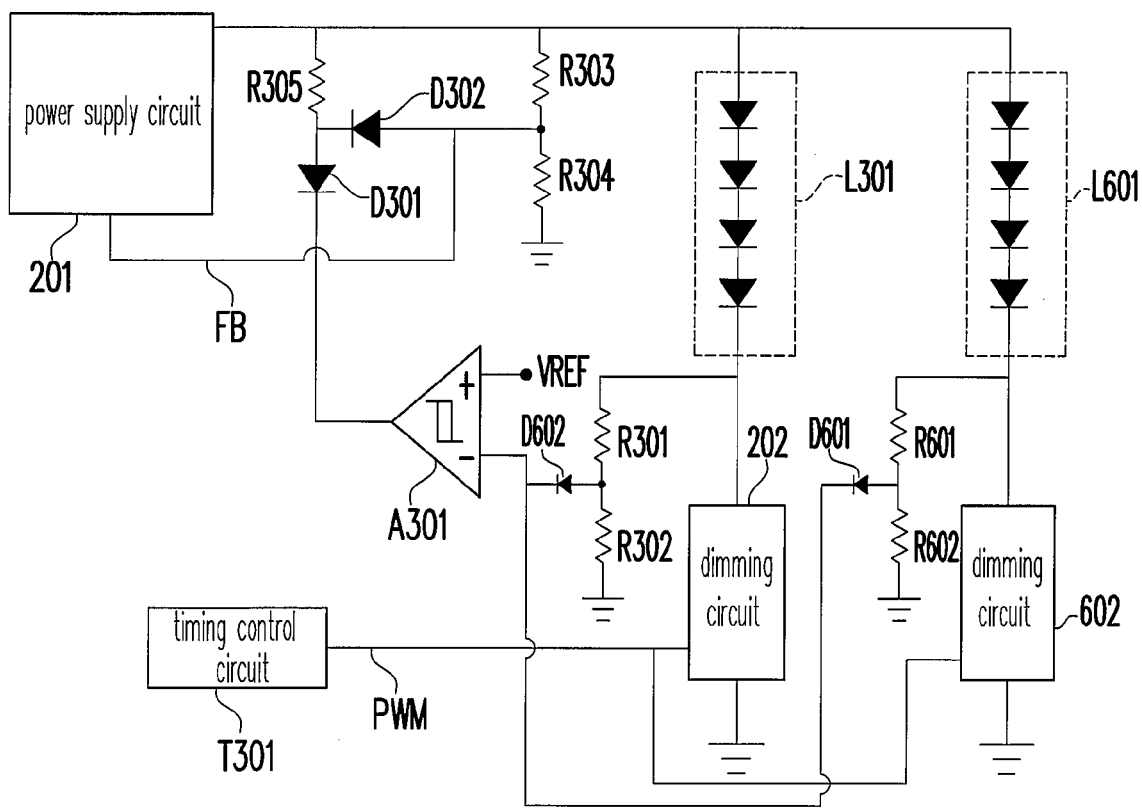
FIG. 6 is a circuit diagram of the light source driving circuit according to the fifth embodiment of the present invention.

FIG. 6 is a circuit diagram of the light source driving circuit according to the fifth embodiment of the present invention. Referring to FIG. 6 and FIG. 3 together, the difference between the circuit of FIG. 6 and the circuit of FIG. 3 is that a set of light emitting diodes L601, a set of dimming circuit 602, and resistors R601, R602, and diodes D601, D602 are further added in FIG. 6 compared with FIG. 3. The operation thereof is that the on/off state of the two sets of light emitting diodes L301, L601 is still determined through the pulse width signal PWM. The difference between the present embodiment and FIG. 4, FIG. 5 is that, in FIG. 4 and FIG. 5, the feedback signal FB is controlled by detecting the on/off state of one light emitting component or one dimming circuit.

However, in the present embodiment, the feedback signal FB is controlled by simultaneously detecting the on/off state of two light emitting components L301 and L501 and two dimming circuits 202, 602 through the first impedance detection circuit including resistors R301, R302, diode D602 and the second impedance detection circuit including resistors R601, R602, diode D601. The operation of the circuit of FIG. 6 can be deduced by those of ordinary skill in the art with reference to the embodiments of FIG. 3~FIG. 5, so the details will not be described herein.

To sum up, in the present invention, the feedback circuit is used to determine the feedback signal according to the on/off state of the dimming circuit, thus achieving the adaptive adjustment for the output voltage by changing the feedback signal and further avoiding damaging the dimming circuit components in the light source driving circuit, and thus prolonging the service life of the light source driving circuit. Furthermore, since the output voltage is adaptively adjusted, the dimming circuit with high price and high withstand voltage is not required, thus further reducing the cost of the internal components of the light source driving circuit and raising the competitiveness of the product.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light source driving circuit, suitable for driving a first light emitting component, the circuit comprising:
   a power supply circuit, having an output terminal and a feedback terminal, wherein the output terminal is coupled to one terminal of the first light emitting component for supplying a power supply voltage to the first light emitting component and determining the value of the power supply voltage according to a feedback signal received by the feedback terminal;
   a first dimming circuit, having a first terminal coupled to another terminal of the first light emitting component and a second terminal coupled to a common level, wherein the first dimming circuit determines the on/off states of the first terminal and the second terminal thereof according to the logic states of a pulse width signal; and
   a feedback circuit, coupled between the first terminal of the first dimming circuit and the feedback terminal of the power supply circuit, for determining the feedback signal according to the on/off state of the first dimming circuit, wherein the feedback circuit comprises:
      an first impedance detection circuit, comprising a first terminal, a second terminal, and a detection terminal, wherein the first terminal is coupled to the first terminal of the first dimming circuit and the second terminal is coupled to the common level, for determining the level output by the detection terminal of the first impedance detection circuit according to the impedance between the first terminal of the first impedance detection circuit and the second terminal of the first impedance detection circuit: and
      a feedback voltage control circuit, having an input terminal coupled to the detection terminal of the first impedance detection circuit and an output terminal outputting the feedback signal, for controlling the value of the voltage of the feedback signal according to the level output by the detection terminal of the first impedance detection circuit.

2. The light source driving circuit as claimed in claim 1, wherein the feedback circuit further comprises an output terminal coupled to the power supply voltage supplier, for determining the feedback signal according to the value of the power supply voltage.

3. The light source driving circuit as claimed in claim 1, wherein the first impedance detection circuit comprises:
   a first impedance component, having one terminal being the first terminal of the first impedance detection circuit, and another terminal being the detection terminal of the first impedance detection circuit, and
   a second impedance component, having one terminal coupled to another terminal of the first impedance component, and another terminal coupled to the common level.

4. The light source driving circuit as claimed in claim 1, further comprising: a timing control circuit, coupled to the first dimming circuit, for converting the brightness setting input into the pulse width signal.

5. The light source driving circuit as claimed in claim 1, wherein the first light emitting component is a tight emitting diode having the anode coupled to the output terminal of the power supply voltage supplier.

6. The light source driving circuit as claimed in claim 1, wherein the first light emitting component is a plurality of light emitting diodes, and the light emitting diodes are connected in series in a manner of coupling an anode to a cathode, wherein the anode of the first light emitting diode is coupled to the output terminal of the power supply voltage supplier.

7. The light source driving circuit as claimed in claim 1, further suitable for driving a second light emitting component, wherein the first dimming circuit further comprises a third terminal coupled to the second light emitting component for determining the on/off state of the third terminal and the second terminal thereof according to the logic states of the pulse width signal.

8. The light source driving circuit as claimed in claim 1, wherein the feedback circuit further comprises:
   an output voltage feedback circuit, coupled between the output terminal of the power supply voltage supplier and the feedback terminal of the power supply voltage supplier, for determining the value of the feedback voltage according to the output voltage of the power supply voltage supplier.

9. The light source driving circuit as claimed in claim 8, wherein the output voltage feedback circuit comprises:
   a fourth impedance component, having one terminal coupled to the output terminal of the power supply voltage supplier, and another terminal coupled to the feedback terminal of the power supply voltage supplier; and
   p1 a fifth impedance component, having one terminal coupled to another terminal of the fourth impedance component, and another terminal coupled to the common level.

10. The light source driving circuit as claimed in claim 1, wherein the feedback voltage control circuit comprises:
   an operational amplifier, comprising a first input terminal, a second input terminal, and an output terminal, wherein the output terminal is coupled to the feedback terminal of the power supply voltage supplier, the first input terminal is coupled to the detection terminal of the first impedance detection circuit, and the second input terminal is coupled to a reference voltage.

11. The light source driving circuit as claimed in claim 10, wherein the feedback voltage control circuit further comprises:

a first diode, having a cathode coupled to the output terminal of the operational amplifier, and an anode coupled to the feedback terminal of the power supply voltage supplier.

12. The light source driving circuit as claimed in claim 11, wherein the feedback voltage control circuit further comprises:
a second diode, having a cathode coupled to the anode of the first diode, and an anode coupled to the feedback terminal of the power supply voltage supplier.

13. The light source driving circuit as claimed in claim 12, wherein the feedback voltage control circuit further comprises:
a third impedance component, having one terminal coupled to the anode of the first diode, and another terminal coupled to the output terminal of the power supply voltage supplier.

14. The light source driving circuit as claimed in claim 1, further suitable for driving a second light emitting component, the light source driving circuit further comprising:
a second dimming circuit, having a first terminal coupled to another terminal of the second light emitting component, and a second terminal coupled to the common level, wherein the second dimming circuit determines the on/off state of the first terminal and the second terminal thereof according to the logic states of the pulse width signal.

15. The light source driving circuit as claimed in claim 14, wherein the second light emitting component is a light emitting diode, and the anode thereof is coupled to the output terminal of the power supply voltage supplier.

16. The light source driving circuit as claimed in claim 14, wherein the second light emitting component is a plurality of light emitting diodes, the light emitting diodes are connected in series in the manner of coupling the anode to the cathode, wherein the anode of the first light emitting diode is coupled to the output terminal of the power supply voltage supplier.

17. The light source driving circuit as claimed in claim 14, wherein the feedback circuit comprises:
a second impedance detection circuit, comprising a first terminal, a second terminal, and a detection terminal, wherein the first terminal is coupled to the first terminal of the second dimming circuit, and the second terminal is coupled to the common level, for determining the level output by the detection terminal of the second impedance detection circuit according to the impedance between the first terminal of the second impedance detection circuit and the second terminal of the second impedance detection circuit, wherein
the input terminal of the feedback voltage control circuit is further coupled to the detection terminal of the second impedance detection circuit for controlling the value of the voltage of the feedback signal according to the level output by the detection terminal of the first impedance detection circuit and the detection terminal of the second impedance detection circuit.

18. The light source driving circuit as claimed in claim 17, wherein each of the first impedance detection circuit and the second impedance detection circuit respectively comprises:
a first impedance component, having one terminal being the first terminal of the first impedance detection circuit;
a second impedance component, having one terminal coupled to another terminal of the first impedance component, and another terminal coupled to the common level;
a first diode, having an anode coupled to another terminal of the first impedance component, and a cathode coupled to the detection terminal of the first impedance detection circuit;
a third impedance component, having one terminal being the first terminal of the second impedance detection circuit;
a fourth impedance component, having one terminal coupled to another terminal of the third impedance component, and another terminal coupled to the common level; and
a second diode, having an anode coupled to another terminal of the third impedance component, and a cathode coupled to the detection terminal of the second impedance detection circuit.

19. The light source driving circuit as claimed in claim 17, wherein the feedback circuit further comprises:
an output voltage feedback circuit, coupled between the output terminal of the power supply voltage supplier and the feedback terminal of the power supply voltage supplier, for determining the value of the feedback voltage according to the output voltage of the power supply voltage supplier.

20. The light source driving circuit as claimed in claim 19, wherein the output voltage feedback circuit comprises:
a fourth impedance component, having one terminal coupled to the output terminal of the power supply voltage supplier, and another terminal coupled to the feedback terminal of the power supply voltage supplier; and
a fifth impedance component, having one terminal coupled to another terminal of the fourth impedance component, and another terminal coupled to the common level.

21. The light source driving circuit as claimed in claim 17, wherein the feedback voltage control circuit comprises:
an operational amplifier, comprising a first input terminal, a second input terminal, and an output terminal, wherein the output terminal is coupled to the feedback terminal of the power supply voltage supplier, the first input terminal is coupled to the detection terminal of the first impedance detection circuit and the detection terminal of the second impedance detection circuit, and the second terminal is coupled to a reference voltage.

22. The light source driving circuit as claimed in claim 21, wherein the feedback voltage control circuit further comprises:
a third diode, having a cathode coupled to the output terminal of the operational amplifier, and an anode coupled to the feedback terminal of the power supply voltage supplier.

23. The light source driving circuit as claimed in claim 21, wherein the feedback voltage control circuit further comprises:
a fourth diode, having a cathode coupled to the anode of the third diode, and an anode coupled to the feedback terminal of the power supply voltage supplier.

24. The light source driving circuit as claimed in claim 23, wherein the feedback voltage control circuit further comprises:
a third impedance component, having one terminal coupled to the anode of the third diode, and another terminal coupled to the output of the power supply voltage supplier.

* * * * *